(12) United States Patent
Jefferson et al.

(10) Patent No.: US 11,255,568 B1
(45) Date of Patent: Feb. 22, 2022

(54) ENERGY CAPTURE VENTILATION DEVICE

(71) Applicants: Curtis Jefferson, Pensacola, FL (US);
Kimberly Jefferson, Pensacola, FL (US)

(72) Inventors: Curtis Jefferson, Pensacola, FL (US);
Kimberly Jefferson, Pensacola, FL (US)

( * ) Notice: Subject to any disclaimer, the term of this patent is extended or adjusted under 35 U.S.C. 154(b) by 0 days.

(21) Appl. No.: 17/032,311

(22) Filed: Sep. 25, 2020

(51) Int. Cl.
*F24F 12/00* (2006.01)
*F03D 9/11* (2016.01)
*F03D 9/25* (2016.01)

(52) U.S. Cl.
CPC ............... *F24F 12/00* (2013.01); *F03D 9/11* (2016.05); *F03D 9/25* (2016.05); *F05B 2220/602* (2013.01)

(58) Field of Classification Search
CPC .... F24F 12/00; F03D 9/11; F03D 9/25; F05B 2220/602
See application file for complete search history.

(56) References Cited

U.S. PATENT DOCUMENTS

| | | | |
|---|---|---|---|
| 8,183,709 B1 | 5/2012 | Manning | |
| 9,812,926 B1 * | 11/2017 | Rodriguez | ............... F03D 9/00 |
| 2009/0065595 A1 * | 3/2009 | Kates | ................... F24F 3/0442 |
| | | | 236/49.3 |
| 2010/0244455 A1 | 9/2010 | Berginc | |
| 2014/0356167 A1 | 12/2014 | Schuler | |
| 2015/0079895 A1 * | 3/2015 | Casey | .................. H05K 5/0217 |
| | | | 454/257 |
| 2016/0003217 A1 | 1/2016 | Allegretti | |
| 2016/0197534 A1 | 7/2016 | Walker et al. | |
| 2018/0147312 A1 * | 5/2018 | Ryerson | ................... A61L 9/122 |
| 2018/0294982 A1 * | 10/2018 | Boemi | ............. H04L 12/40032 |
| 2019/0245712 A1 * | 8/2019 | Yu | ....................... H04L 12/4625 |

* cited by examiner

*Primary Examiner* — Tulsidas G Patel
*Assistant Examiner* — Joseph Ortega
(74) *Attorney, Agent, or Firm* — Boudwin Intellectual Property; Daniel Boudwin

(57) ABSTRACT

An energy capture ventilation device is provided. The energy ventilation device includes a housing. The housing is formed by a number of side walls to define an interior volume. A duct is connected to the housing, to interface with a ventilation system. A vent is placed on the housing opposite of the duct. At least one generator is attached to the duct. The generator includes a turbine and is connected to a battery. When the turbine is rotated, power is supplied to the battery.

16 Claims, 4 Drawing Sheets

ENERGY CAPTURE VENTILATION DEVICE

BACKGROUND OF THE INVENTION

The present invention relates to an energy capture ventilation device. More specifically, the present invention provides a mechanism for capturing energy generated by air being circulated through a structure's HVAC system.

Most residential and commercial buildings are equipped with heating, ventilation, and air conditioning (HVAC) systems. These systems are utilized to increase the inhabitants' comfort and to improve the air quality within the building. Though these systems are intricate and may utilize several combinations of components, there are several aspects that are inherent in every HVAC system. Ventilation, or the process of changing or replacing air, is a primary driving force in controlling temperature, humidity, odors and contaminants. These systems typically involve the use of fans to push air through ducts to alter the air conditions and heat levels of a desired location.

As this air is pushed through the ventilation systems, energy is generated by the movement of this air. Typically, these air currents are not utilized for the purpose on generating electricity. Households, particularly, may deal with inefficient electricity use. This can result in expensive utility bills. At times, home electricity may run out or may experience a power outage. During power outages, individuals may be unable to see where they are and may be required to use candles or flashlights.

Therefore, there is a defined need amongst the known arts for a device that is capable of gathering wasted energy within buildings and repurposing that energy for useful functions. Ideally the system will be capable of being integrated upon a building and will provide utility in the form of powering useful safety technologies.

SUMMARY OF THE INVENTION

In view of the foregoing disadvantages inherent in the known types of HVAC system accessories now present in the prior art, the present invention provides an energy capture ventilation device wherein the same can be utilized for providing convenience for the user when capturing energy generated by HVAC system air currents.

The present system comprises a housing. The housing is formed by a plurality of side walls. The plurality of side walls is arranged such that an interior volume is defined. A duct is disposed on a top surface of the vent. The duct defines a channel. The channel is in operable connection with the interior volume of the housing, such that air may be forced into and out of the housing through the duct. A vent is disposed on the bottom surface of the housing.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
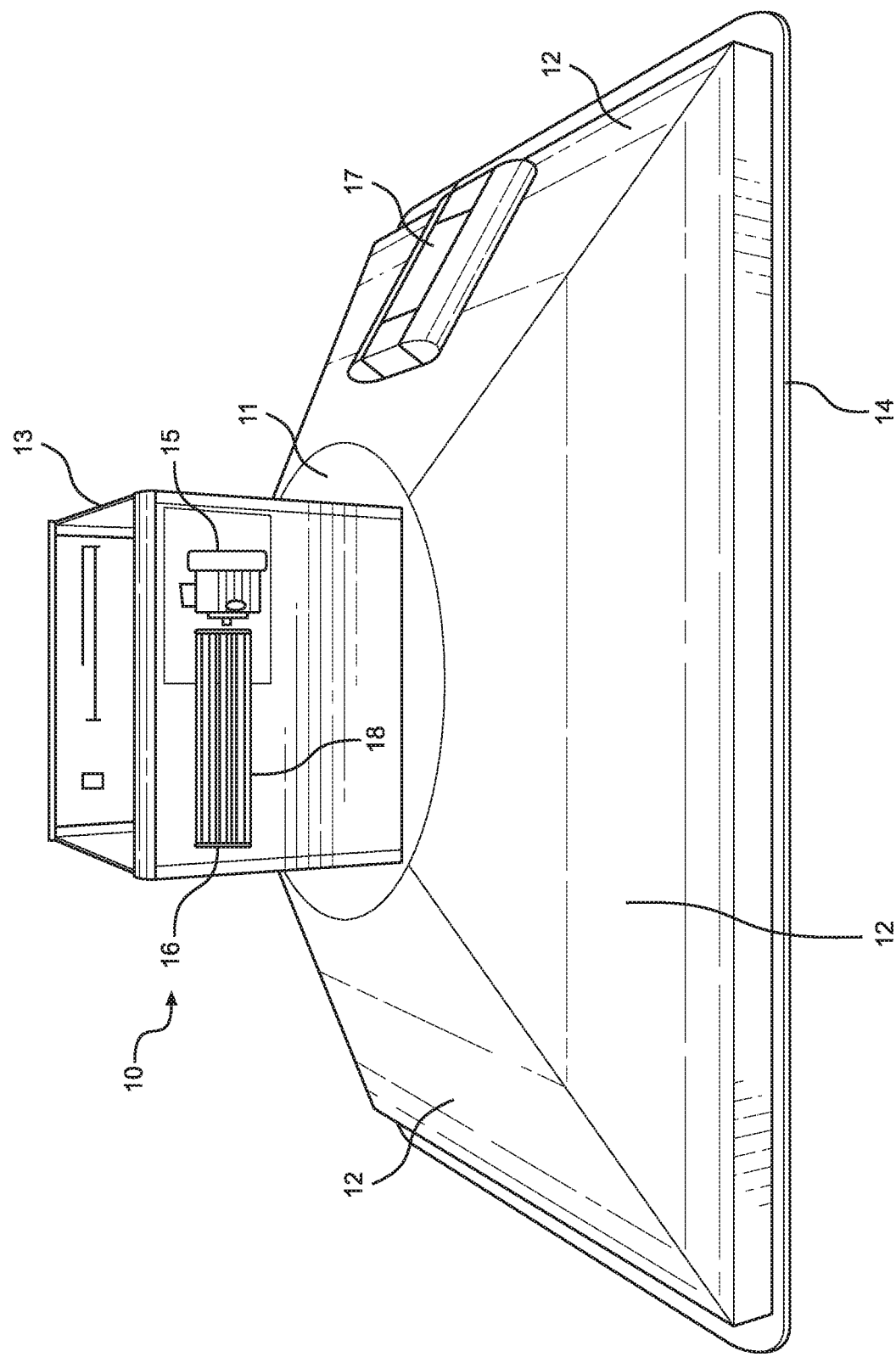
FIG. 1 shows a perspective top view of an embodiment of the energy capture ventilation device.

Reference is made herein to the attached drawings. Like reference numerals are used throughout the drawings to depict like or similar elements of the energy capture ventilation device. The figures are intended for representative purposes only and should not be considered to be limiting in any respect.

Referring now to FIG. 1, there is shown a perspective top view of an embodiment of the energy capture ventilation device. The energy capture ventilation device 10 comprises a housing 11. The housing 11 is formed by a plurality of side walls 12. The plurality of side walls 12 form an interior volume, through which air may be pushed or pulled to create an air current. In the illustrated embodiment, each side wall of the plurality of side walls 12 is sloped, such as to reduce air current loss into and out of the housing 11, and to accommodate a larger opening on a bottom surface of the housing 11 compared to the top surface of the housing 11. A duct 13 is disposed on the top surface of the housing 11. The duct 13 defines a channel. The channel is in operable connection with the interior volume of the housing 11. As such, air currents may be directed into the interior volume or out of the interior volume through the duct 13. In the illustrated embodiment, the duct 13 is of a quadrilateral cross-section having four duct walls.

A vent 14 (shown in FIG. 3) is disposed on the bottom surface of the housing 11. The vent 14 is configured to prevent debris from passing in and out of the housing 11, as well as providing a mechanism for adjusting the air current externally from the HVAC system of the building on which the energy capture ventilation device 10 is installed. In the illustrated embodiment, the vent 14 is rectangular, such as to be installable within a traditional vent opening of a building. However, in alternate embodiments, the vent 14 is of any suitable shape or configuration for installation within a desired vent opening.

At least one generator 15 is installed on the duct 13. The generator 15 is configured to gather energy from the air current being pushed or pulled through the interior volume of the housing 11 and the channel of the duct 13. Structurally, the generator 15 is in operable connection with a turbine 16. The turbine 16 as shown comprises a plurality of fins 18. Each fin of the plurality of fins 18 is laterally disposed in a circular arrangement such as to rotate when placed in the path of the air current. As force is applied to the plurality of fins 18, they will rotate, creating rotational energy. The turbine 16 will then rotate, providing the rotational energy to the generator 15.

The generator 15 is in operable connection with at least one battery 17. The battery 17 is of any suitable configuration for receiving electrical currents, storing electrical currents, and releasing electrical currents. For example, in some embodiments, the battery 17 may be a lithium battery. Furthermore, the generator 15 is in operable connection with the battery 17 by any known mechanism, such as by a hard-wire connection.

Figure 2:
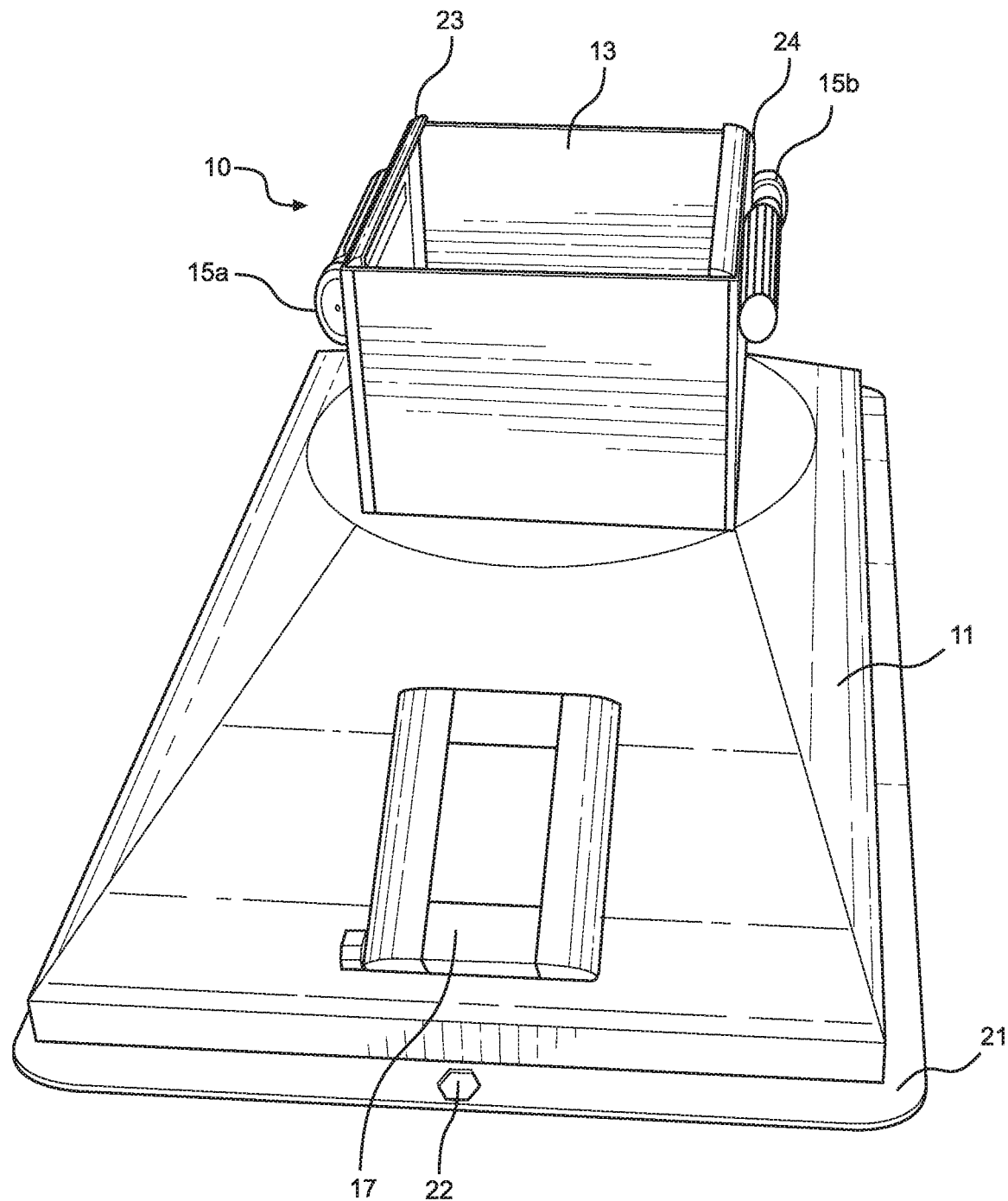
FIG. 2 shows a perspective side view of an embodiment of the energy capture ventilation device.

Referring now to FIG. 2, there is shown a perspective side view of an embodiment of the energy capture ventilation device. In the illustrated embodiment, the battery 17 is disposed on an external surface of the housing 11. As such, the battery 17 will be located in a close proximity to the generator 15a, 15b. In the illustrated embodiment, a pair of generators 15a, 15b are provided. The battery 17 is disposed equidistantly between each generator 15a, 15b of the pair of generators. The pair of generators 15a, 15b comprises a first generator 15a and a second generator 15b. The first generator 15a is disposed on a first side 23 of the duct 13 while the second generator 15b is disposed on the opposing second side 24 of the duct 13. Furthermore, the second generator 15b is oriented in an opposite direction horizontally of the first generator 15a, such that rotational energy can be gathered equally from pushing or pulling air through the energy capture ventilation device 10.

In the illustrated embodiment, the vent 14 comprises a flange 21. The flange 21 extends beyond the perimeter of the housing 11, such that the flange 21 may be utilized to form a flush surface with a wall, floor, or ceiling upon which the energy capture ventilation device 10 is installed. Furthermore, in the illustrated embodiment, the flange 21 comprises a plurality of apertures 22. In the illustrated embodiment, a pair of apertures 22 are disposed on each opposing side of the flange. The plurality of apertures 22 is configured to provide access through the flange 21 for a plurality of fasteners. The plurality of fasteners are of any suitable configuration for securing the energy capture ventilation device 10 to an installation structure, such as a screw, a nail, a bolt or the like.

Figure 3:
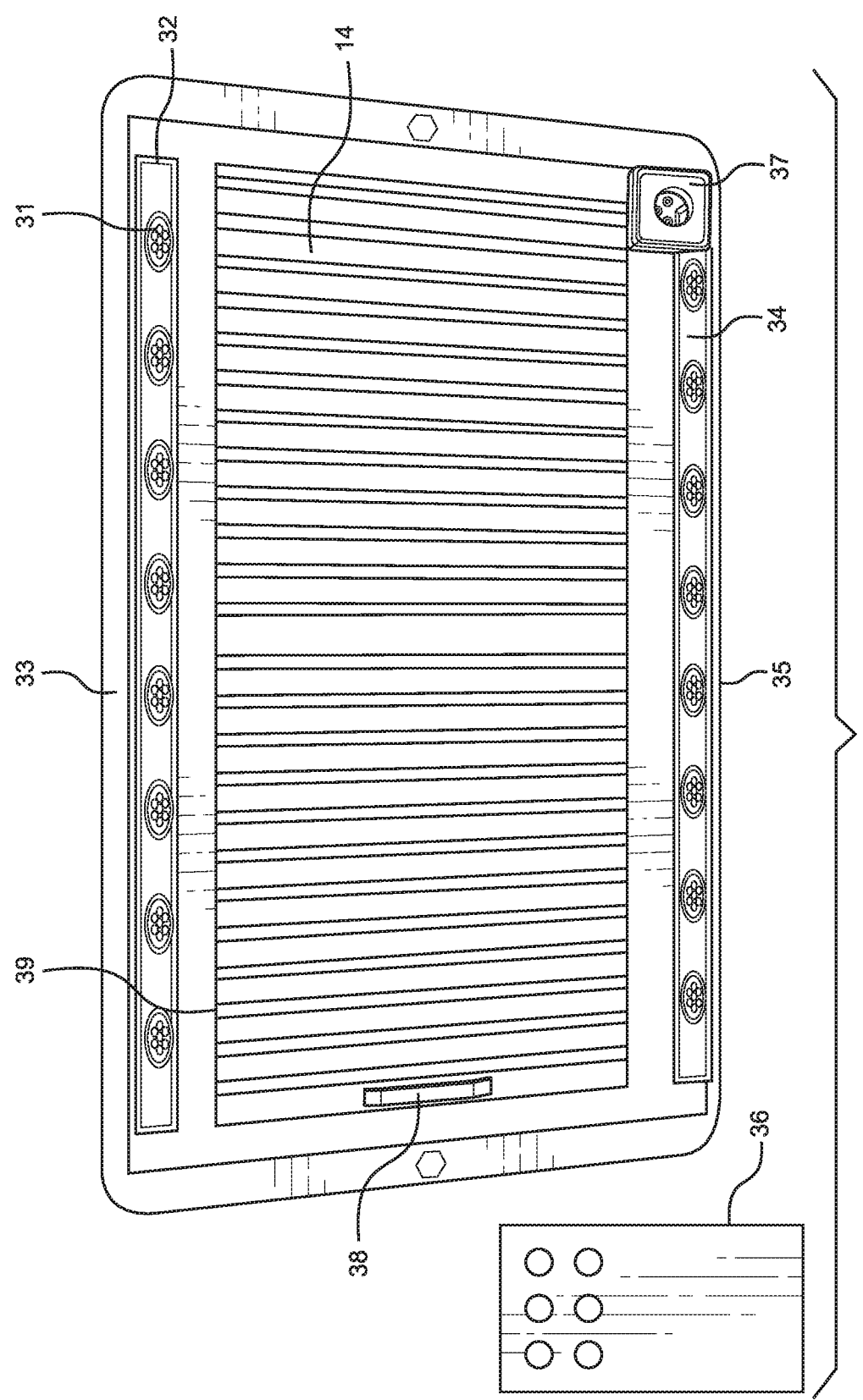
FIG. 3 shows a bottom view of an embodiment of the energy capture ventilation device.

Referring now to FIG. 3, there is shown a bottom view of an embodiment of the energy capture ventilation device. At least one light 31 is disposed on an external surface of the vent 14. Each light 31 is in operable connection with the battery, such that power gathered by each generator is supplied to each light 31. In the illustrated embodiment, the plurality of lights 31 comprising a first row of lights 32 disposed along a first edge 33 of the vent 14 and a second row of lights 34 disposed on a second edge 35 of the vent 14. As such, light is provided to a wider area from the vent 14. In some embodiments, the battery may be in operable connection with an external lighting device, such that power is provided to an additional light source in the event of a power outage or similar event. The lights 31 are of any suitable configuration for providing light to an area. In some embodiments, the lights 31 are light-emitting diodes (LEDs).

The energy capture ventilation device further comprises a smoke detector 37. The smoke detector 37 is of any suitable configuration for detecting the presence of smoke and/or fire and emitting an alarm when smoke and/or fire is detected. The smoke detector 37 is disposed on the bottom surface of the vent 14, such as to ensure the most efficient and accurate detection of smoke or fire. The smoke detector 37 is in operable connection with the battery, such as to ensure that the smoke detector 37 does not run out of power. This provides convenience to the user, such as to eliminate the need to test and replace batteries within a stand-alone smoke detector.

In the illustrated embodiment, the vent 14 further comprises a vent actuator 38. The vent actuator 38 is configured to adjust or manipulate a plurality of louvers 39 of the vent 14. The plurality of louvers 39 are rotatably installed within the vent 14, such that they may be utilized to adjust the direction and the strength of the air current leaving or entering the housing. In some embodiments, the vent actuator 38 comprises a motor. As such, the plurality of louvers 39 may be adjusted electronically instead of manually.

The plurality of lights 31 are controllable and actuatable by any suitable means. In the illustrated embodiment, the plurality of lights 31 are controllable via a remote control 36. The remote control 36 is configured to be usable within a distance of the vent 14, such that the functions of the energy capture ventilation device may be controlled. In addition to the actuation of the plurality of lights 31, the remote control 36 may be utilized to actuate the motor in operable connection with the louver system of the vent 14, to deactivate or test the smoke detector 37, or to turn the generators on and off. Furthermore, in some embodiments, the plurality of lights 31, the smoke detector 37 and the vent actuator 38 are in operable connection with a wireless signal receiver, such that they can be controlled over a wireless internet connection.

Figure 4:
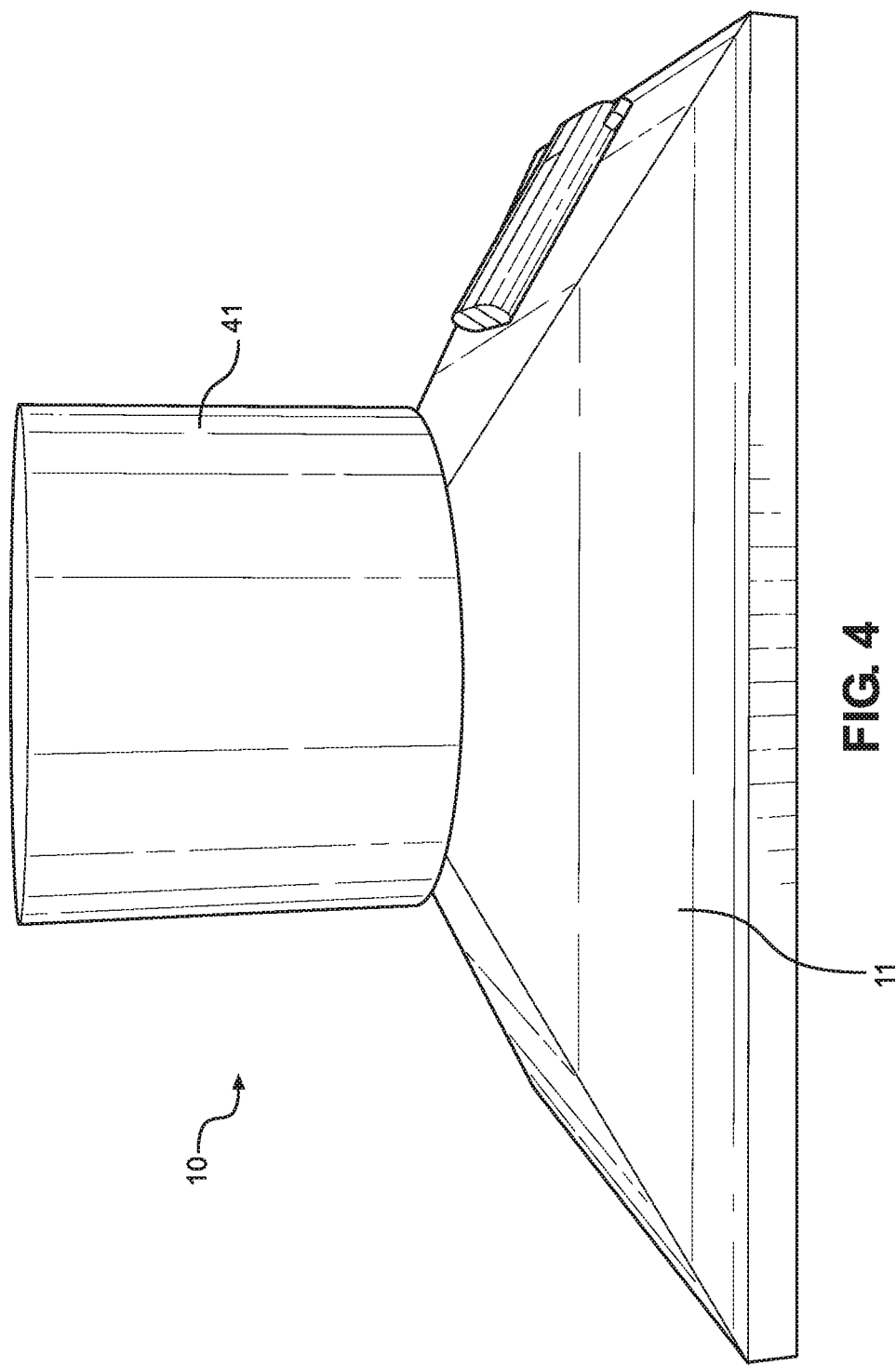
FIG. 4 shows a demonstrative view of an embodiment of the energy capture ventilation device.

Referring now to FIG. 4, there is shown a demonstrative view of an embodiment of the energy capture ventilation device 10. In the illustrated embodiment, a duct cover 41 is placed over the energy capture ventilation device 10. As such, the air current is directed through both the channel of the duct into the interior volume of the housing 11 and upon the generators disposed on the external surface of the duct. The duct cover 41 provides a connection to the HVAC system of a building upon which the energy capture ventilation device 10 is installed. As such, the duct itself is in operable connection with the HVAC system of the building.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An energy capture ventilation device, comprising:
    a housing;
    the housing formed by a plurality of sloped side walls;
    the plurality of sloped side walls arranged to form an interior volume;
    the housing sandwiched between a duct and a vent;
    the duct disposed on a top surface of the housing;
    the duct defining a channel;
    the channel in operable connection with the interior volume of the housing;
    the vent disposed on the bottom surface of the housing;
    at least two generators disposed on the duct;
    a first generator of the at least two generators is disposed on a first side of the duct and a second generator of the at least two generators is disposed on an opposite side of the duct, wherein air therethrough can be gathered equally from pushing of air in the first generator of the at least two generators and pulling air in the second generator of the at least two generators;
    each generator of the at least two generators comprises a turbine; and
    each generator of the at least two generators is in operable connection with a battery.

2. The energy capture ventilation device of claim 1, further comprising at least one light disposed on an external surface of the vent.

3. The energy capture ventilation device of claim 2, wherein the at least one light comprises a first row of lights disposed on a first edge of the vent and a second row of lights disposed on a second edge of the vent.

4. The energy capture ventilation device of claim 1, wherein the at least one light is actuatable via a remote control.

5. The energy capture ventilation device of claim 1, further wherein the vent defines a flange.

6. The energy capture ventilation device of claim 5, further comprising a plurality of apertures disposed in the flange.

7. The energy capture ventilation device of claim 1, wherein the turbine comprises a plurality of fins.

8. The energy capture ventilation device of claim 1, wherein the battery is disposed on an external surface of the housing.

9. The energy capture ventilation device of claim 1, wherein the duct is in operable connection with the HVAC system of a building.

10. The energy capture ventilation device of claim 1, wherein the battery is in operable connection with an external lighting device.

11. The energy capture ventilation device of claim 1, wherein the vent is rectangular.

12. The energy capture ventilation device of claim 1, further comprising a smoke detector.

13. The energy capture ventilation device of claim 1, further comprising a vent actuator, wherein the vent actuator manipulates a plurality of louvers on the vent.

14. The energy capture ventilation device of claim 13, wherein the vent actuator comprises a motor; whereby the motor is operably connected to the plurality of louvers on the vent.

15. The energy capture ventilation device of claim 14, wherein the vent actuator is engageable via a remote control.

16. The energy capture ventilation device of claim 1, further comprising a vent cover configured to cover the duct.

\* \* \* \* \*